United States Patent
Zahn et al.

(10) Patent No.: US 7,501,606 B2
(45) Date of Patent: Mar. 10, 2009

(54) DEVICE FOR INDUCTION HARDENING

(75) Inventors: Andreas Zahn, Riegel (DE); Kurt Schmerek, Aalen-Dewangen (DE)

(73) Assignee: Maschinenfabrik Alfing Kessler GmbH, Aalen (DE)

( * ) Notice: Subject to any disclaimer, the term of this patent is extended or adjusted under 35 U.S.C. 154(b) by 171 days.

(21) Appl. No.: 10/561,587

(22) PCT Filed: May 12, 2004

(86) PCT No.: PCT/EP2004/005055

§ 371 (c)(1),
(2), (4) Date: Dec. 12, 2005

(87) PCT Pub. No.: WO2004/111278

PCT Pub. Date: Dec. 23, 2004

(65) Prior Publication Data

US 2007/0056959 A1    Mar. 15, 2007

(30) Foreign Application Priority Data

Jun. 13, 2003    (EP) .................................. 03013526

(51) Int. Cl.
*H05B 6/10*    (2006.01)
(52) U.S. Cl. ........................ 219/639; 219/637; 219/643

(58) Field of Classification Search .................. 219/639, 219/635, 636, 637, 643, 640, 641, 642, 644
See application file for complete search history.

(56) References Cited

U.S. PATENT DOCUMENTS

| 3,784,780 | A | * | 1/1974 | Laughlin et al. | ............ 219/639 |
| 5,451,749 | A | | 9/1995 | Griebel et al. | |
| 6,140,625 | A | * | 10/2000 | Gezarzick et al. | ........... 219/639 |
| 6,153,865 | A | * | 11/2000 | Storm et al. | ................ 219/672 |
| 6,160,247 | A | * | 12/2000 | Storm et al. | ................ 219/639 |
| 6,160,248 | A | * | 12/2000 | Ottenwaelder et al. | ...... 219/639 |
| 6,362,462 | B1 | * | 3/2002 | Merrell et al. | ............... 219/672 |

FOREIGN PATENT DOCUMENTS

| DE | 72 30 942 | 12/1972 |
| DE | 29 32 438 | 2/1981 |
| DE | 197 52 237 | 5/1999 |

* cited by examiner

*Primary Examiner*—Daniel L Robinson
(74) *Attorney, Agent, or Firm*—Eugene M. Cummings, P.C.

(57) ABSTRACT

A device (1) for the induction hardening of components (2) which have a circular cross section, especially crankshafts, has two inductor half-shells (4, 5) arranged along a portion of the periphery of the component (2) to be hardened. At least one of the two inductor half-shells (4, 5) has only one inductor segment (6) through which current flows.

9 Claims, 2 Drawing Sheets

DEVICE FOR INDUCTION HARDENING

The invention relates to a device for the induction hardening of components which have a circular cross section, especially crankshafts, with two inductor half-shells arranged along a portion of the periphery of the component to be hardened.

Devices of the generic type are known from the general prior art. By means of these devices, crankshafts for example are hardened in their outer layer, to be precise by the two inductor half-shells being brought up to the component to be hardened and said component rotating between the inductor half-shells. A current is then passed through the inductor segments of the inductor half-shells, whereby the component to be hardened is heated. After quenching, which, depending on the material of the component, is carried out with an aqueous polymer solution or oil, a specific hardness of the component is then obtained.

The known devices have two inductor segments for each of the inductor half-shells, in each case resulting in substantially congruent heating by the two inductor half-shells of the component to be hardened. For this reason, the hardening zone of the hardened component is very inhomogeneous and, on account of its particular shape with a depression or "dent" in the middle, is also referred to as a "dog bone". On account of this inhomogeneous form of the hardening zone, it is very difficult to establish in practical use whether an adequate hardening depth has been reached in the hardening process. Although the depth of the hardening zone can be inferred to a certain degree from the width of the same, more precise conclusions are to be regarded as extremely critical on account of the pronounced depression in the middle of the hardening zone. It is therefore required in practice to make cuts through the hardening zone at relatively frequent time intervals to allow the hardening depth to be measured. However, this procedure is on the one hand very laborious and on the other hand always leads to destruction of the component to be hardened.

The problematical situation described is adversely experienced in particular in the case of crankshafts on which the bearing locations to be hardened have a very small axial dimension, as is more frequently the case with modern crankshafts.

It is therefore the object of the present invention to provide a device for the induction hardening of components which have a circular cross section, especially crankshafts, with which a more homogeneous form of the hardening zone can be achieved, and with it greater reliability of the process.

According to the invention, this object is achieved by at least one of the two inductor half-shells having only one inductor segment through which current flows.

The fact that, according to the invention, at least one of the two inductor half-shells only has one inductor segment allows a very much more homogeneous hardening zone to be achieved in the component to be hardened, with which the depression in the middle can be avoided. This more homogeneous hardening zone makes it possible to conclude from the lateral spacing of the hardening zone from the edge of the component, that is from the width of the hardening zone, the depth of the same, whereby laborious measuring procedures can be avoided.

A further advantage is that the tolerances that are usually prescribed by customers for the lateral spacing of the hardening zone can now be better exploited, since, even with a relatively great lateral spacing, and consequently a relatively narrow hardening zone, the depth of the same is adequate or reliably achieved, and this produces a high level of reliability of the process. As a result, the device according to the invention can be used over a longer period of time and it is no longer necessary for the inductor segments through which current flows, which are responsible for heating the component, to be exchanged as often because they have become worn. The required presettings and examinations of the inductor segments are reduced correspondingly. On account of these reserves in the process, the time intervals at which measurements are taken on the components to be hardened can advantageously also be increased.

Furthermore, with the device according to the invention, a relatively precisely defined amount of heat is introduced into the component, whereby it is possible to carry out the tempering of the component that is usually required after the hardening just from that residual heat that is still in the component. This makes it possible to dispense with otherwise necessary furnaces which are arranged downstream of the hardening installation and in which the components are tempered. This saves not only procurement costs but also maintenance and production costs and additionally requires a smaller amount of space.

At the same time, it is advantageously possible even for already existing induction devices to be retrofitted with the inductor half-shells. In spite of only one inductor segment, no increase in power is required for the inductor half-shell concerned, but instead the power can in some cases even be reduced on account of the better efficiency that is obtained by the arrangement according to the invention. By shortening the heating times, an overall reduction in the cycle time can be advantageously obtained.

In a very advantageous development of the invention, it may be provided that one of the inductor half-shells has two inductor segments and that the other inductor half-shell has only one inductor segment.

With such an arrangement, components of a width that is not extremely small can be hardened very well in particular, since the inductor half-shell which has the two inductor segments can be used to achieve an adequate width of the hardening zone, whereas the inductor half-shell which has only one inductor segment can be used or arranged in such a way that an adequate depth of the hardening zone is obtained.

It is of particular advantage in this connection if the inductor half-shell which has the single inductor segment is arranged offset in the longitudinal direction of the component with respect to the inductor half-shell which has the two inductor segments in such a way that the single inductor segment is located centrally between the two inductor segments.

The central arrangement of the single inductor segment with respect to the two inductor segments achieves the effect that, precisely in that region in which the hardening depth would in fact be less on account of the intermediate space between the two inductor segments, it is nevertheless adequately great, since the single inductor segment can ensure the adequate hardening depth. A further advantage of this configuration is that it is very much easier to set the inductor segments or the inductor half-shells, since the inductor half-shell with the single inductor segment only has to be set centrally with respect to the inductor half-shell with the two inductor segments, it being possible for the inductor half-shell with the two inductor segments to be easily set for lateral coupling, and, as mentioned above, the lateral tolerances can be easily maintained.

In the case of particularly narrow components or portions of components to be hardened, it may be advantageous if the two inductor half-shells each have only one inductor segment.

In this connection, it may be provided that the two inductor half-shells are arranged offset in relation to each other in the longitudinal direction of the component to be hardened.

This offset arrangement of the inductor segments with respect to each other allows the width of the hardening zone to be varied, while adequate verifiability of the hardening depth is nevertheless ensured as long as a certain width of the component to be hardened is not exceeded.

Further advantageous refinements and developments of the invention emerge from the remaining subclaims and from the exemplary embodiments represented in principle below on the basis of the drawing, in which:

Figure 6:
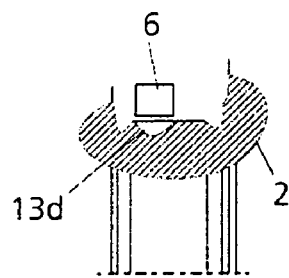
FIG. 6 shows a schematic representation of the resultant hardening zone of the component to be hardened in the case of hardening by an inductor half-shell with one inductor segment.
Figure 7:
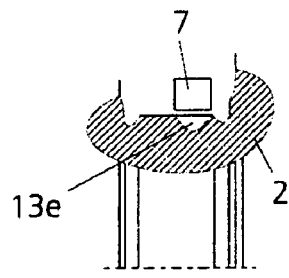
Figure 8:
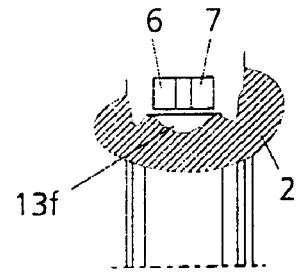

FIG. 7 shows a schematic representation of the resultant hardening zone of the component to be hardened in the case of hardening by an inductor half-shell with an inductor segment arranged offset in relation to the inductor segment from FIG. 6; and FIG. 8 shows a schematic representation of the resultant hardening zone of the component to be hardened in the case of hardening by the two inductor half-shells from FIG. 6 and FIG. 7.

Figure 1:
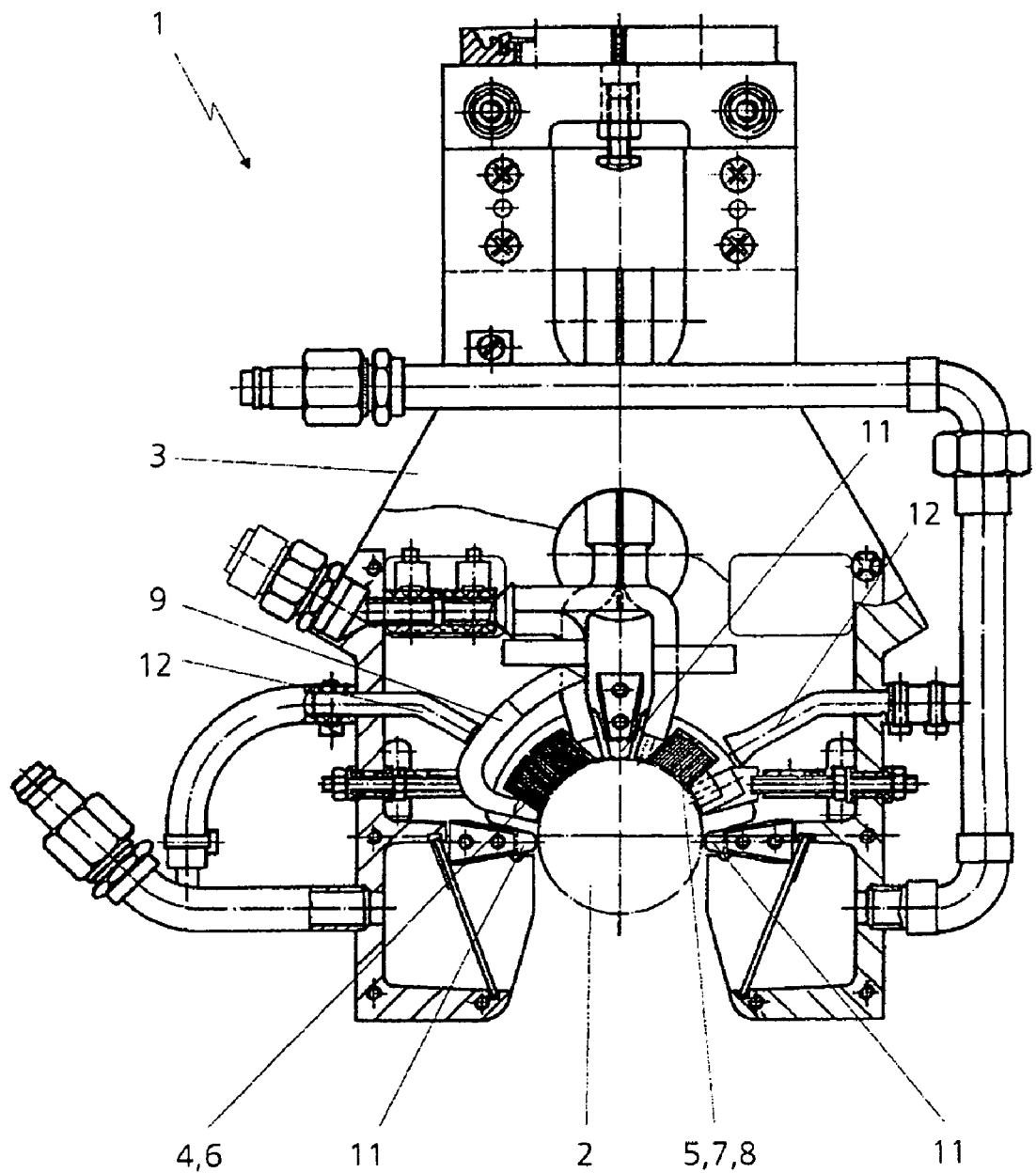
FIG. 1 shows a plan view of a device for induction hardening according to the invention.

FIG. 1 shows a device 1 for hardening a component 2 of circular cross section. The component 2 may be, for example, a crankshaft for an internal combustion engine, the bearing locations of which are to be hardened by means of the device 1. The component 2 does not necessarily have to have a continuously circular cross section, but the cross section at the location to be hardened is in each case circular.

The device 1 has a housing 3, in which two inductor half-shells 4 and 5 extending along part of the periphery of the component 2 are arranged. The first inductor half-shell 4, arranged in the present case on the left side of the housing 3, has a conductor through which current flows, which consists for example of copper and is referred to as inductor segment 6. By contrast, the inductor half-shell 5, which in the present case is on the right side of the housing 3 and is offset by a specific angle with respect to the first inductor half-shell 4 along the periphery of the component 2, has two inductor segments 7 and 8, which in the present case likewise consist of copper and likewise extend along the periphery of the component 2. The inductor half-shells 4 and 5 or the inductor segments 6, 7 and 8 are provided with current supply and removal leads, which however may be configured in a known way and are therefore not discussed in any more detail. It should merely be mentioned that the inductor half-shell 4 has a return segment 9, which together with the inductor segment 6 provides a closed circuit of the inductor half-shell 4. In the case of the inductor half-shell 5, the closed circuit is ensured by the two inductor segments 7 and 8, which can extend in a conventional way.

Figure 2:
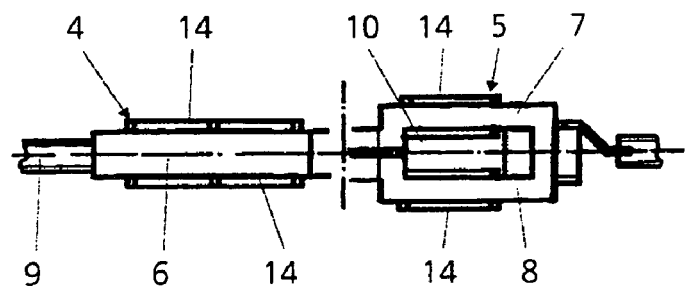
FIG. 2 shows a view of the device according to the invention as indicated by the arrow II from FIG. 1.

In FIG. 2, the different configuration of the two inductor half-shells 4 and 5 can be seen more clearly. Thus, the two inductor segments 7 and 8 of the inductor half-shell 5 extend at a distance from each other and form an intermediate space 10 between them. The inductor segment 6 of the inductor half-shell 4 is arranged centrally between the two inductor segments 7 and 8 and covers the intermediate space 10. In the present case, the single inductor segment 6 is made wider than the two inductor segments 7 and 8, for example twice as wide, these geometrical relationships depending substantially on the component 2 to be hardened. It goes without saying that the inductor segment 6 could also be made narrower than the intermediate space 10 and consequently not cover the same. In general, the inductor segment 6 should be arranged centrally with respect to the two inductor segments 7 and 8, and consequently centrally with respect to the intermediate space 10.

To harden the component 2, current is passed through the inductor segments 6, 7 and 8 and the component 2 is rotated. If the surface of the component 2 that is to be hardened is a bearing surface arranged eccentrically in relation to the center axis, for example a bearing surface of a connecting rod, the device 1 must perform a corresponding movement during this rotation in order for it constantly to maintain a uniform distance from the component 2, the so-called coupling distance. For this purpose, arranged between the two inductor half-shells 4 and 5 and outside the same in the present case are three sliding shoes 11, which are in contact with the component 2 and in this way ensure a constant coupling distance. If appropriate, however, contactless accompanying movement of the device 1 during the movement of the component 2 would also be possible. On account of the current flow through the inductor segments 6, 7 and 8, the same are heated and lead to heating of the component 2 by magnetic induction, for example to a temperature of 950° C. Once the component 2 has reached a corresponding temperature, preferably an aqueous polymer solution is directed onto the component 2 by means of so-called sprays 12, and in this way provides for cooling of the same. This heating and rapid cooling of the component 2 achieves the effect, in a way known per se, of changing the microstructure within the component 2, which is constituted by the hardening zone 13a-13f that is represented in FIGS. 3 to 8. During this heating of the component 2, a relatively precisely defined amount of heat is introduced into the same, whereby it is possible after the hardening process to carry out the tempering of the component 2 from the residual heat that is still in the component 2. This takes place at the material-specific tempering temperature.

In this case, both the single inductor segment 6 and the two inductor segments 7 and 8 are provided with metal plates 14, which serve to increase the magnetic field and consequently improve the efficiency of the device 1. To increase the hardening depth, the metal plates 14 and/or the coupling distance can be changed.

Figure 3:
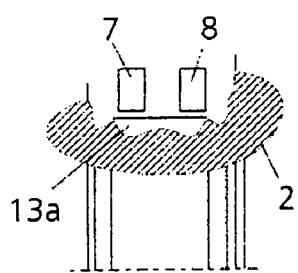
FIG. 3 shows a schematic representation of the resultant hardening zone of the component to be hardened in the case of hardening by an inductor half-shell with two inductor segments.

Represented in FIG. 3 is the hardening zone 13a, which is obtained if the component 2 were hardened by means of the second inductor half-shell 5, which has both inductor segments 7 and 8. It can clearly be seen in this case that the hardening zone 13a is not homogeneously formed overall and has in the middle, that is in that region in which the intermediate space 10 is located in the case of the inductor half-shell 5, a depression or "dent". This depression leads to a reduction in the hardening depth of the hardening zone 13a, which is accompanied by the problems described above with respect to the quality of the components 2. This form of the hardening zone 13a is generally referred to as a "dog bone" and also occurs in the case of hardening methods according to the prior art if both inductor half-shells each have two inductor segments.

Figure 4:
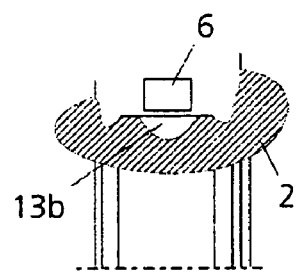
FIG. 4 shows a schematic representation of the resultant hardening zone of the component to be hardened in the case of hardening by an inductor half-shell with one inductor segment.

FIG. 4 shows the hardening zone 13b, which is produced if the hardening method were performed just with the first inductor half-shell 4 with the one inductor segment 6. In this case it can be seen that, although the hardening zone 13b has an adequate depth, the width of the same is too small for the width represented of the surface of the component 2 that is to be hardened.

Figure 5:
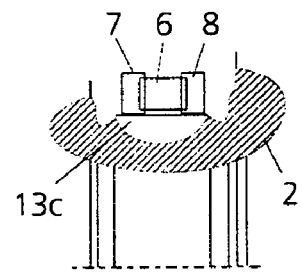
FIG. 5 shows a schematic representation of the resultant hardening zone of the component to be hardened in the case of hardening by the two inductor half-shells from FIG. 3 and FIG. 4.

Represented in FIG. 5 is the hardening zone 13c, which is obtained if the hardening process is carried out with the two inductor half-shells 4 and 5 described with reference to FIGS. 1 and 2. A clear overlap between the two hardening zones 13a and 13b can thus be seen, leading to the homogeneous hardening zone 13c without depressions and with a substantially planar extent in the middle region according to FIG. 5.

This homogeneous hardening zone 13c allows the lateral spacing of the hardening zone 13c from the edge of the component 2 to be used to conclude the depth of the same. This lateral spacing of the hardening zone 13c can be determined, for example, by etching, so that destruction of the component 2 is not necessary.

FIGS. 6, 7 and 8 show further hardening zones 13d, 13e and 13f, which are obtained if the second inductor half-shell 5 of the device 1 has only one inductor segment, for example the inductor segment 7. The hardening zone 13d according to FIG. 6 is formed in a way similar to the hardening zone 13b according to FIG. 4, since here, too, only one inductor segment, namely the inductor segment 6 of the first inductor half-shell 4, is used. However, this is arranged outside the middle.

The same also applies to the hardening zone 13e according to FIG. 7, which is merely offset in the longitudinal direction of the component 2 with respect to the hardening zone 13d, since the inductor segment 7 of the second inductor half-shell 5 is offset in the longitudinal direction of the component 2 with respect to the inductor segment 6 of the first inductor half-shell 4.

FIG. 8 shows the hardening zone 13f, which is obtained if the component 2 is hardened by means of the two inductor half-shells 4 and 5 according to FIGS. 6 and 7. Here, too, it can be seen that the hardening zone 13f is considerably more homogeneous than is the case with the hardening zone 13a. The offset of the two inductor segments 6 and 7 of the inductor half-shells 4 and 5 in relation to each other allows the width of the hardening zone 13f to be determined in this case.

A device 1, in which the inductor half-shells 4 and 5 each have only one inductor segment 6, is advisable in particular whenever the width of the surface of the component 2 that is to be hardened is very small, for example in the case of very narrow bearing locations of crankshafts. In this connection, it would also be possible not to offset the two inductor half-shells 4 and 5 but to arrange them congruently with respect to the component 2. The resultant hardening zone would be similar to the hardening zones 13d and 13e according to FIGS. 6 and 7 and would be suitable for extremely narrow surfaces to be hardened.

The invention claimed is:

1. A device for the induction hardening of components which have a circular cross section, especially crankshafts, the device comprising: two inductor half-shells arranged along a portion of the periphery of the component to be hardened, one of the two inductor half-shells has two inductor segments and the other inductor half-shell has only one inductor segment through which current flows, the inductor half-shell which has the single inductor segment is arranged offset in a longitudinal direction of the component with respect to the inductor half-shell which has the two inductor segments in such a way that the single inductor segment is located centrally between the two inductor segments, and wherein a return branch of the inductor half-shell having only one inductor segment is displaced rearwardly relative to the surface of the component to be hardened.

2. The device as claimed in claim 1, characterized in that between the two inductor segments there is an intermediate space, the single inductor segment being arranged centrally with respect to the intermediate space.

3. The device as claimed in claim 1, characterized in that the two inductor half-shells are arranged offset in relation to each other in the longitudinal direction of the component to be hardened.

4. The device as claimed in claim 1, characterized in that respectively arranged between the two inductor half-shells and outside the two inductor half-shells are sliding shoes, which are provided for coming into contact with the component to be hardened.

5. The device as claimed in claim 1 characterized in that the inductor half-shells are formed as contactlessly operating inductor half-shells.

6. The device as claimed in claim 2, characterized in that respectively arranged between the two inductor half-shells and outside the two inductor half-shells are sliding shoes, which are provided for coming into contact with the component to be hardened.

7. The device as claimed in claim 2, characterized in that the inductor half-shells are formed as contactlessly operating inductor half-shells.

8. The device as claimed in claim 3, characterized in that respectively arranged between the two inductor half-shells and outside the two inductor half-shells are sliding shoes, which are provided for coming into contact with the component to be hardened.

9. The device as claimed in claim 3, characterized in that the inductor half-shells are formed as contactlessly operating inductor half-shells.

* * * * *